Aug. 19, 1930.  C. LECRENIER  1,773,189
WATER MOTOR
Filed July 2, 1928  2 Sheets-Sheet 1

Inventor
C. Lecrenier.
By Arthur Minnick
Attorney

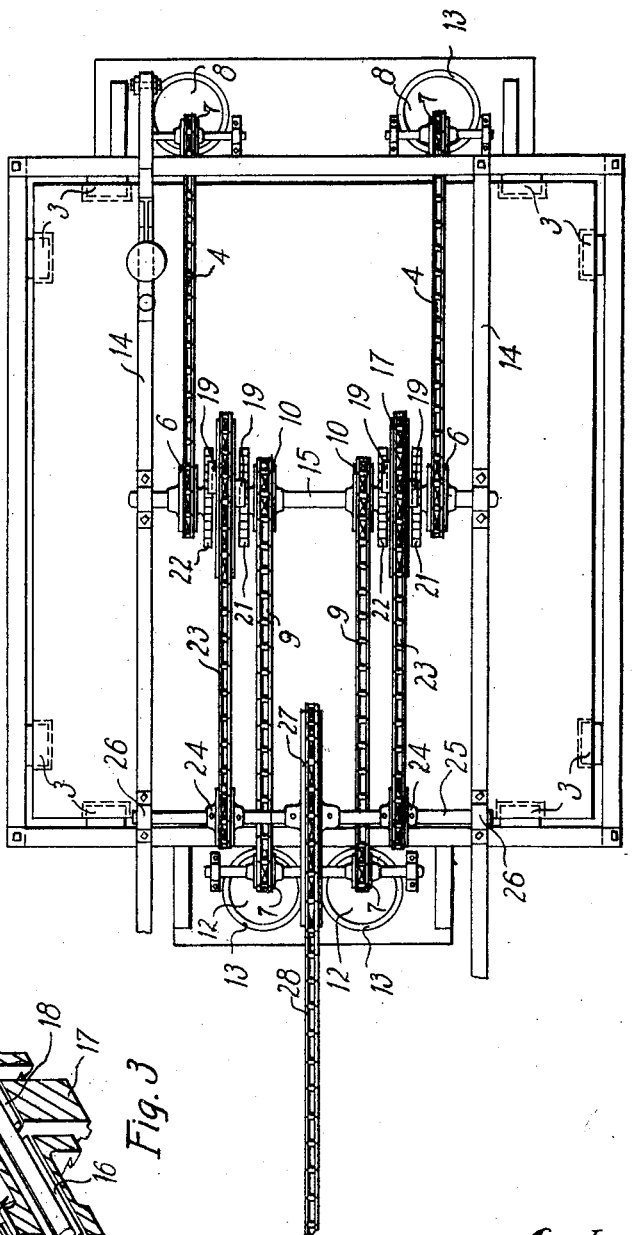

Patented Aug. 19, 1930

1,773,189

UNITED STATES PATENT OFFICE

CELESTIN LECRENIER, OF TAMPA, FLORIDA

WATER MOTOR

Application filed July 2, 1928. Serial No. 289,704.

This invention relates to water motors of the type in which a float is mounted for vertical movement in a pit or well provided with means permitting the inflow and outflow of water, the float having counterbalance weights connected therewith by chains which pass over sprocket wheels mounted upon shafts above the pit, the arrangement being such that vertical movements of the float and the weights caused by the movement of the water produces rotation of the sprocket wheels which is transmited to a suitable means for performing work.

An object of the invention is the provision of a motor suitable for operation either by water from a flowing stream or by the rise and fall of the tides.

Another object of the invention is the provision of an improved means for causing a rotary member to be rotated in the same direction by alternating upward and downward movement of the float and weights.

A further object of the invention is to simplify and cheapen the cost of construction of such motors.

A preferred form of the invention is illustrated in the accompanying drawings in which Figure 1 is a vertical section of a motor with parts in elevation;

Fig. 2 is a plan view; and

Fig. 3 is an isometric view partly in section of a sprocket wheel with its associated ratchet wheels.

Figure 1:
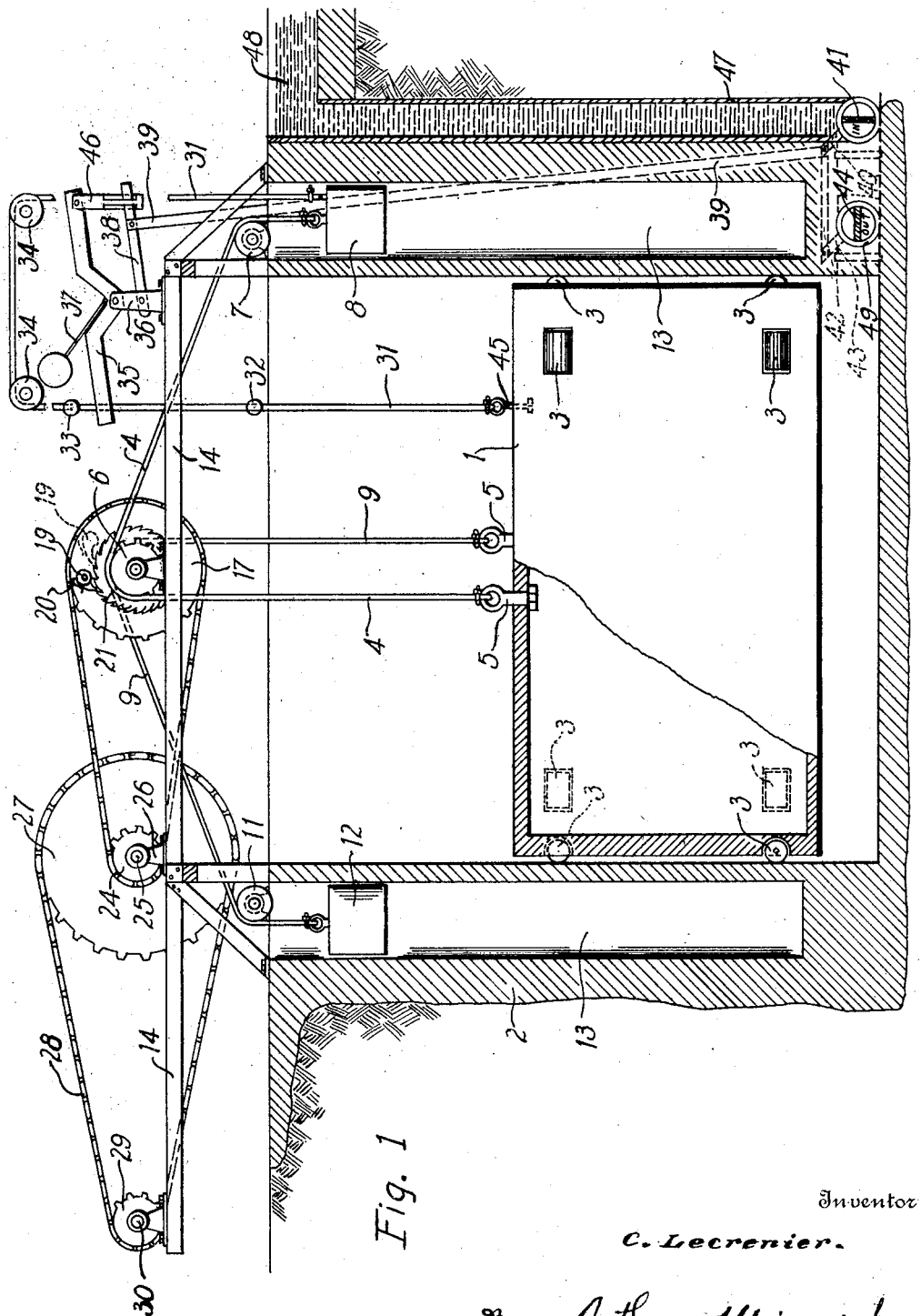

A float 1 of any suitable material is mounted for vertical movement within a well or pit 2 preferably constructed of concrete to provide substantial waterproof walls and floor which will resist the continuous movement of water, and in the sides of the float are suitably journalled anti-friction rollers 3. Chains 4, 4, secured to the float 1 as by bolts 5, are shown in Figs. 1 and 2 as passing upward on the left side of sprocket wheels 6, 6, into engagement therewith and thence across to the right over sprocket wheels 7, 7, and downward into connection with weights 8, 8. Chains 9, 9, are shown as passing upward on the right side of sprocket wheels 10, 10, into engagement therewith and thence across to the left over sprocket wheels 11, 11, and downward into connection with weights 12, 12.

Suitable pockets 13, 13, are provided within the concrete for the weights 8, 8, and 12, 12, and these four weights together will weigh about half as much as the float 1.

Transverse beams 14, 14, are mounted above the pit 2 to support a shaft 15 on which the sprocket wheels are journaled preferably by roller bearings 16, 16, as indicated in Fig. 3. Sprocket wheels 17, 17 are journaled on the same shaft 15, as by roller bearings 18.

Upon opposite sides of the wheels 17 are pivoted pawls 19, 19, which are held by springs 20, 20, pressed into engagement with ratchets 21, 22, of which the ratchet 21 is rigidly united with sprocket wheel 6 and ratchet 22 is rigidly united with sprocket wheel 10. Chains 23, 23, form a driving connection between the sprocket wheels 17, 17, and sprocket wheels 24, 24, keyed upon a shaft 25, rotatably mounted in journal boxes 26, 26, upon the beams 14, 14. A third sprocket wheel 27 is also keyed upon the shaft 25 and is connected by the chain 28 with the sprocket wheel 29 on the shaft 30 from which power may be taken to drive a generator, a pump, or other mechanism not shown.

As the float 1 rises, the weight 8 will pull the chain 4 to cause clockwise movement of the sprocket wheel 6 and of the ratchet 21, and the engagement of the adjacent pawl 19 with this ratchet will cause the clockwise rotation of the sprocket wheel 17. At the same time, the weight 12 will pull upon the chain 9 to cause a counterclockwise rotation of the sprocket wheel 10 with the ratchet 22, and this opposite rotation of the ratchet 22 will permit the ratchet teeth to slip past the adjacent pawl.

As the float descends, the ratchet 22 will engage the pawl 19 to cause clockwise rotation of the sprocket wheel 17 and the ratchet 21 will slip past its pawl. Thus the alternating upward and downward movements of the weights and the float cause the wheel 17 to turn on its axis in the same direction.

A cord 31 provided with knobs 32 and 33 passes over pulleys 34, 34, and is attached at one end to the float 1 as at 45, and at the other end is attached to the weight 8. A tilting lever 35 pivoted on a standard 36 is provided with a pivoted weight arm 37 adapted to engage the lever 35 alternately on opposite sides of its center. As the float rises, the knob 32 will engage the lever 35 and lift it to a point at which the weight arm 37 will fall to the opposite side causing an abrupt downward movement of the opposite end of the lever 35. Beneath this lever is another lever 38 having a link 39 pivoted thereto which extends downward to a pivotal connection with an arm 40 which operates an intake valve 41. A link 42 is pivoted at one end to the arm 40 and at the other end to an arm 43 which operates an outlet valve 44. A link 46 connects the lever 35 with the lever 38 with enough lost motion to permit almost complete upward movement of the float before the weight arm 37 will fall to cause downward movement of the link 39 to operate the valve arms. As the intake valve opens, the outlet valve is closed and vice versa.

The knob 33 operates the lever 35 as the float descends to bring the parts into the position shown in Fig. 1.

The valve 41 controls the flow of water through the pipe 47 from any suitable source of supply 48, which may be water from a stream held by a dam, or any other flowing water.

The valve 44 controls the pipe 49 which serves as an outlet for the water admitted through the pipe 47, but it is obvious that the same motor may be used as a tide motor, in which case the pipe 49 would serve as both inlet and outlet, and the valve 44 would be allowed to remain open whenever the motor was to be used.

When used as tide motor, there would of course be no need for the lever 35 and its associated operating means, nor for the valve 41.

I claim:

1. A water motor comprising a well provided with valves controlling inflow and outflow of water, a float mounted for vertical movement in the well, a shaft having wheels mounted thereon, chains connected to the float and passing over the wheels, vertically movable weights connected to the chains, and automatic means operated by vertical movement of the float and one of said weights to cause movement of the inflow and outflow valves to close one when the other is opened.

2. A water motor comprising a well provided with valves controlling inflow and outflow of water, a float mounted for vertical movement in the well, a shaft having wheels rotatably mounted thereon, chains connected with the float and passing on opposite sides of the shaft over the wheels, vertically movable weights on opposite sides of the shaft connected with the chains, whereby vertical movement of the float and weights will cause rotation of the wheels in opposite directions, and automatic means operated by vertical movement of the float and one of said weights to cause simultaneous operation of the inflow and outflow valves to close one as the other is opened.

3. A water motor comprising a well provided with means for permitting inflow and outflow of water, a float mounted for vertical movement in the well, a shaft having three wheels rotatably mounted thereon, the central wheel having pawl and ratchet engagement on each side with the outer wheels whereby rotation of the outer wheels in one direction will cause rotation of the central wheel in the same direction, and a chain on each outer wheel, each chain connected at one end to the float and passing over the wheel, two weights movable vertically, each connected to one of said chains, the chains passing from the float on opposite sides of the shaft each to one of said weights whereby to cause the outer wheels to rotate in opposite directions.

In testimony whereof, I affix my signature.

CELESTIN LECRENIER.